(12) United States Patent
Vaught

(10) Patent No.: US 7,953,765 B2
(45) Date of Patent: May 31, 2011

(54) SYSTEM AND METHOD FOR STORING METRICS IN A DATABASE

(75) Inventor: Jeffrey A. Vaught, Batavia, OH (US)

(73) Assignee: Computer Associates Think, Inc., Islandia, NY (US)

( * ) Notice: Subject to any disclaimer, the term of this patent is extended or adjusted under 35 U.S.C. 154(b) by 1604 days.

(21) Appl. No.: 10/887,137

(22) Filed: Jul. 7, 2004

(65) Prior Publication Data

US 2005/0010933 A1      Jan. 13, 2005

Related U.S. Application Data

(60) Provisional application No. 60/486,779, filed on Jul. 11, 2003.

(51) Int. Cl.
*G06F 17/30* (2006.01)
(52) U.S. Cl. ........................................ 707/803
(58) Field of Classification Search .................. None
See application file for complete search history.

(56) References Cited

U.S. PATENT DOCUMENTS

| | | | |
|---|---|---|---|
| 5,291,583 A | 3/1994 | Bapat | |
| 5,295,256 A | 3/1994 | Bapat | |
| 5,317,742 A | 5/1994 | Bapat | |
| 5,542,078 A | 7/1996 | Martel et al. | |
| 5,546,577 A | 8/1996 | Marlin et al. | 395/600 |
| 5,596,746 A | 1/1997 | Shen et al. | |
| 6,128,628 A * | 10/2000 | Waclawski et al. | 1/1 |
| 6,349,404 B1 | 2/2002 | Moore et al. | |
| 6,470,354 B1 | 10/2002 | Aldridge et al. | 707/103.4 |
| 6,704,744 B1 | 3/2004 | Williamson et al. | |
| 7,013,469 B2 * | 3/2006 | Smith et al. | 719/328 |
| 7,017,162 B2 * | 3/2006 | Smith et al. | 719/328 |
| 7,072,807 B2 * | 7/2006 | Brown et al. | 703/1 |
| 2003/0105732 A1 * | 6/2003 | Kagalwala et al. | 707/1 |
| 2005/0240943 A1 * | 10/2005 | Smith et al. | 719/328 |

OTHER PUBLICATIONS

"*User Guide—Microsoft Operations Manager 2000*," Microsoft Corporation, XP-002302452, 2001, Cover pages, Table of Contents and information pages (9 pages), and pp. 1-99, http://www.microsoft.com/mom/docs/userg.pdf, visited Oct. 21, 2004.

Steigner, Christoph, et al., "Multi-Source Performance Analysis of Distributed Software," *Proceedings of the Communication Networks and Distributed Systems Modeling and Simulation Conference*, San Antonio, TX, Jan. 27, 2002, XP-002302448, pp. 1-16.

Microsoft Corporation, "*The Microsoft Windows Management Instrumentation Extensions to the Windows Driver Model*", XP-002302449, Sep. 1998, pp. 1-6.

Distributed Management Task Force, Inc., "*Specification for the Representation of CIM in XML*," Version 2.0, XP-002302453, Jun. 2, 1999, pp. 1-30.

(Continued)

*Primary Examiner* — Charles Rones
*Assistant Examiner* — Mellissa M Chojnacki
(74) *Attorney, Agent, or Firm* — Pillsbury Winthrop Shaw Pittman LLP

(57) ABSTRACT

The invention relates to a system and method for storing data associated with an extensible instrumentation layer. The system and method include receiving metrics from an extensible instrumentation layer in an operating system. The metrics are defined by at least one class and a plurality of properties, with each property being associated with one class. The metrics are converted into at least one database-compliant data structure and stored in a database.

30 Claims, 6 Drawing Sheets

OTHER PUBLICATIONS

Distributed Management Task Force, Inc., "*Common Information Model (CIM) Specification*," Version 2.2, XP-002302454, Jun. 14, 1999, Cover pages, Abstract, History and Table of Contents (8 pages) and pp. 1-97.

Distributed Management Task Force, "*The Common Information Model*," Technical Note, XP-002302450, Jan. 2003, 3 pgs.

Davis, Jim, "*WBEM Services Specification JSR-0048*," Java Developer Conference, San Francisco, CA, Jun. 6, 2001, XP-002302451, pp. 1-43.

Notification of Transmittal of the International Search Report and the Written Opinion of the International Searching Authority, or the Declaration—Form PCT/ISA/220 (3 pages); PCT International Search Report—Form PCT/ISA/210 (5 pages), and Written Opinion of the International Searching Authority—Form PCT/ISA/237 (7 pages), PCT/US2004/022031, mailed Nov. 12, 2004.

"The Unified Modeling Language (UML)", *Unified Modeling Language User Guide*, Santa Clara, CA, USA, Jan. 1, 1996, XP2941831, pp. 1-9.

\* cited by examiner

SYSTEM AND METHOD FOR STORING METRICS IN A DATABASE

RELATED APPLICATION

This application claims the priority under 35 U.S.C. §119 of provisional application Ser. No. 60/486,779 filed Jul. 11, 2003.

TECHNICAL FIELD

This disclosure relates generally to the field of data processing and, more specifically, to storing metrics in a database.

BACKGROUND

Microsoft's .NET application is software that includes the .NET Framework, which is typically used for developing and running network-based applications and web services. These applications often operate over a network through standard, platform-independent protocols including, for example, eXtensible Markup Language (XML), Simple Object Access Protocol (SOAP), and Hypertext Transfer Protocol (HTTP). The .NET Framework includes the common language runtime (CLR), which assists memory, process, and thread management. The CLR Profiler is a profiling tool for .NET-compatible applications. Windows Management Instrumentation (WMI) is an extensible instrumentation layer built into many Windows or Windows-based operating systems. WMI exposes namespaces, classes, and properties for hardware devices, the operating system, and applications. When Microsoft .NET framework is installed, a number of classes are created for the management of .NET. These are often located within "root/CIMV2" and may include various CLR classes, ASP.NET Overall, and ASP.NET by Application, which normally includes web services. Moreover, many correlated operating systems metrics, such as CPU load and disk queue length, can be collected from the extensible instrumentation layer.

SUMMARY

A system and method for storing data associated with an extensible instrumentation layer are provided. In one embodiment, the method includes receiving metrics from an extensible instrumentation layer in an operating system. The metrics are defined by at least one class and a plurality of properties, with each property being associated with one class. The metrics are converted into at least one database-compliant data structure and stored in a database. The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
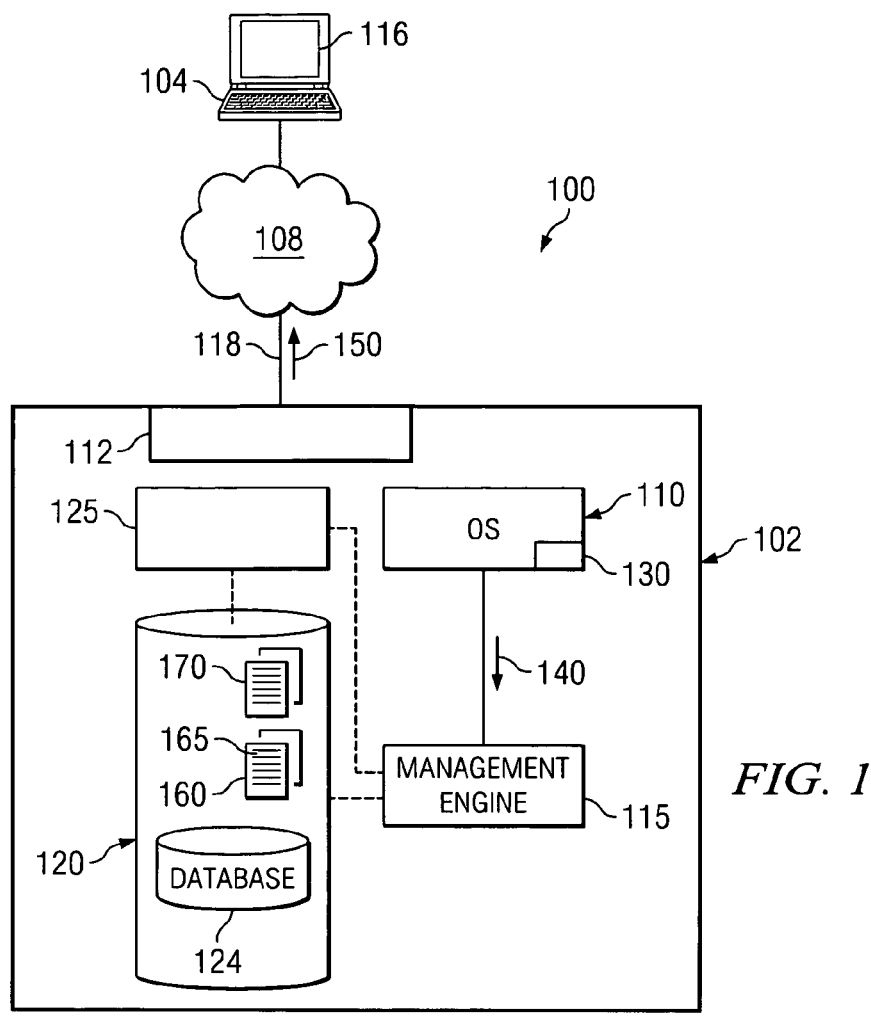
FIG. 1 illustrates a system for storing metrics in a database according to certain embodiments of the disclosure.

FIG. 1 is a block diagram illustrating a distributed computing system 100 including management engine 115 for storing Windows, Windows-based, or other class-based metrics 140 in a database-like repository according to one embodiment of the present disclosure. Metrics 140 may be any data or information collected or generated by an extensible instrumentation layer 130. For example, metrics 140 may include load time for one or more assemblies, modules, and classes, load count of one or more assemblies, modules, and classes, load failures for one or more classes, jit compile time for one or more functions, jit search time for one or more functions, jit count for one or more functions, jit compile failures for one or more functions, function execution time for one or more functions, function exceptions for one or more functions, function interop boundary crossings for one or more functions, number of compilations, number of sessions, number of applications, and many others. At a high level, system 100 is a client/server environment comprising at least one client or management workstation 104, a server or host 102, and network 108, but may also be a standard or local computing environment or any other suitable environment. In general, system 100 dynamically provides a system component or a system administrator or other user with a plurality of Windows, Windows-based, or Windows-compatible metrics 140, typically communicated in a class/method format, in a database table/column format. For example, system 100 may comprise an environment automatically providing one or more users with the ability to easily manage or view .NET framework metrics 140 and correlated metrics 140. The term "automatically," as used herein, generally means that the appropriate processing is substantially performed by at least part of system 100. It should be understood that "automatically" further contemplates any suitable user or administrator interaction with system 100 without departing from the scope of this disclosure. The term "dynamically," as used herein, generally means that certain processing is determined, at least in part, at run-time based on one or more variables.

Server 102 includes memory 120 and processor 125 and comprises an electronic computing device operable to receive, transmit, process and store data associated with system 100. Server 102 may comprise a general-purpose personal computer (PC), a Macintosh, a workstation, a Unix-based computer, a server computer, or any other suitable device. For example, server 102 may be a blade server or a web server. In short, server 102 may comprise software and/or hardware in any combination suitable to gather metrics 140 and convert metrics 140 into one or more database-compliant data structures. FIG. 1 only provides one example of computers that may be used with the disclosure. For example, although FIG. 1 provides one example of server 102 that may be used with the disclosure, system 100 can be implemented using computers other than servers, as well as a server pool. The present disclosure contemplates computers other than general purpose computers as well as computers without conventional operating systems. In other words, as used in this document, the term "computer" is intended to encompass any suitable processing device. Computer server 102 may be adapted to execute any operating system 110 including Windows NT, Windows 2000, Windows Server, Windows Storage Server, Windows XP home or professional, or any other suitable operating system including an extensible instrumentation layer 130.

Memory 120 may include any memory or database module and may take the form of volatile or non-volatile memory including, without limitation, magnetic media, optical media, random access memory (RAM), read-only memory (ROM), removable media, or any other suitable local or remote memory component. In this embodiment, illustrated memory 120 includes database 124, at least one mapping table 170, and (at least temporarily) one or more SQL scripts or statements 160, but may also include any other appropriate data. Database 124 stores one or more database tables, with each table including one or more columns. Database 124 may receive records, schemas, or any other suitable data through interface 112 or from another process running on server 102. In one embodiment, database 124 may be a relational database management system (or DBMS). Relational databases often use sets of schemas to describe the tables, columns, and relationships between the tables using basic principles known in the field of database design. But while described as a relational database, database 124 may be any data repository of any suitable format including XML documents, flat files, Btrieve files, comma-separated-value (CSV) files, an object oriented database, name-value pairs, and others so long as it remains operable to load, store, interface, or reference one or more SQL scripts 160.

Generally, SQL script 160 comprises any SQL API, code, or other statement 165 operable to process any suitable data storage. For example, SQL script 160 may comprise a plurality of SQL statements 165, such as JOIN, DROP_TABLE, MODIFY, SELECT, DELETE, or UPDATE, without departing from the scope of this disclosure. It will be understood that script 160 may include one or more SQL statements 165 and may be used interchangeably as appropriate without departing from the scope of the disclosure. SQL script 160 may be used by any DBMS or database 124, whether local or remote, to select, modify, delete, or otherwise process one or more data structures associated with database 124. As used herein, "SQL" references any of the plurality of versions of the SQL relational database query and manipulation language such as, for example, SQL, ANSI SQL, or any other variant or generic database or repository query language. Moreover, this disclosure contemplates any suitable API, script, or executable in any suitable language and format compatible with database 124.

Memory 120 also stores one or more mapping tables 170, with each mapping table 170 comprising a logical format operable to map, or is associated with, at least a subset of metrics 140. Each mapping table 170 may be an XML document, an object, an array, or any logical or physical component operable to map metrics 140 to a database schema using SQL script 160. Further, it will be understood that mapping table 170 may be local or remote, as well as temporary or persistent, without departing from the scope of the disclosure. In one embodiment, system 100 may include two mapping tables 170. For example, first mapping table 170 may be used by management engine 115 to map .NET framework metrics 140 and second mapping table 170 may be used by management engine 115 to map correlated or other metrics 140. Moreover, first and second mapping tables 170 may be two logical portions of the same XML document, object, or array. For example, mapping table 170 may include one or more portions, tags, and sub-tags in a readable format such as illustrated below:

.NET Framework Portion

```
<DatabaseTbl InstTbl="WMI_CLRLoad_Instance"
ThreshTbl="WMI_CLRLoad_Thresh"
WMIClass="Win32_PerfRawData_NETFramework_NETCLRLoading">
    <Prop DBCol="Node" Text="Y" ThreshTbl="Y"> </Prop>
    <Prop DBCol="ClrName" Text="Y" ThreshTbl="Y">Name</Prop>
    <Prop DBCol="TStamp" Text="Y" TStamp="Y" > </Prop>
    <Prop DBCol="AppDomainsLoaded"
ThreshDerived="Y">Currentappdomains</Prop>
    <Prop DBCol="AssembliesLoaded" ThreshDerived="Y">Current
Assemblies</Prop>
    <Prop DBCol="ClassesLoaded"
ThreshDerived="Y">CurrentClassesLoaded</Prop>
    <Prop DBCol="ModulesLoaded" ThreshDerived="Y"> </Prop>
    <Prop DBCol="AssemblyReloads" ThreshDerived="Y"> </Prop>
    <Prop DBCol="ModuleReloads" ThreshDerived="Y"> </Prop>
    <Prop DBCol="ClassReloads" ThreshDerived="Y"> </Prop>
    <Prop DBCol="JitPitches" ThreshDerived="Y"> </Prop>
    <Prop DBCol="ClassLoadFailures"
ThreshDerived="Y">TotalNumberofLoadFailures</Prop>
    <Prop DBCol="TotalClassesLoaded"
ThreshDerived="Y">TotalClassesLoaded</Prop>
</DatabaseTbl>
```

Correlated Portion

```
<entity id="e6">
    <description>Processor</description>
    <item selected="1">Win32_Processor</item>
    <oncontextmenu> </oncontextmenu>
    <image>../../tndportal/images/map-service</image>
    <imageOpen>../../tndportal/images/map-
service_mgn.gif</imageOpen>
    <onContextMenu>context/contextAssembly.xx</onContextMenu>
    <contents>
        <entity id="e61">
        <description>Allprocessors</description>
        <item selected="1"> </item>
        <image>../../tndportal/images/map-fsys</image>
        <imageOpen>../../tndportal/images/map-
fsys</imageOpen>
        <onContextMenu>context/contextClass.xxx</onContextMenu>
            <contents>
            <entity id="e611">
        <description>CPUClockSpeed</description>
            <item selected="1">Current ClockSpeed</item>
            <image>../../tndportal/images/map-files</image>
        <imageOpen>../../tndportal/images/map-files</imageOpen>
                <onClick> </onClick>
    <onContextMenu>context/contextFunction.xx</onContextMenu>
            </entity>
            <entity id="e612">
            <description>CPULoad</description>
            <item selected="1">LoadPercentage</item>
            <image>../../tndportal/images/map-files</image>
        <imageOpen>../../tndportal/images/map-files</imageOpen>
                <onClick> </onClick>
    <onContextMenu>context/contextFunction.xx</onContextMenu>
            </entity>
            </contents>
        </entity>
    </contents>
</entity>
```

It will be understood that the above illustrations are for example purposes only and mapping table 170 may include none, some, or all of the illustrated tags, as well as other tags and data structures, without departing from the scope of the disclosure.

Server 102 also includes processor 125. Processor 125 executes instructions and manipulates data to perform the operations of server 102 such as, for example, a central processing unit (CPU), an application specific integrated circuit (ASIC) or a field-programmable gate array (FPGA). Although FIG. 1 illustrates a single processor 125 in server 102, multiple processors 125 may be used according to particular needs, and reference to processor 125 is meant to include multiple processors 125 where applicable. In the embodiment illustrated, processor 125 executes management engine 115 that processes metrics 140 for use in system 100. Management engine 115 could include any hardware, software, firmware, or combination thereof operable to receive or retrieve metrics 140 from extensible instrumentation layer 130 (such as WMI), automatically map metrics 140 to one or more SQL statements 160 based on mapping table 170, and transform the data such that any data repository or display, such as database 124, may store or reference it. For example, management engine 115 may provide client 104 with data displays 150, reports 150, or management interfaces 150 operable to view and manipulate the stored metrics 140. It will be understood that while management engine 115 is illustrated as a single multi-tasked module, the features and functionality performed by this engine may be performed by multiple modules such as, for example, a retrieving module, a transforming module, and an editing module. Moreover, while not illustrated, management engine 115 may be a child or sub-module of any other appropriate software module such as, for example, an enterprise infrastructure management application without departing from the scope of this disclosure.

Server 102 also often includes interface 112 for communicating with other computer systems, such as client 104, over network 108 in a client-server or other distributed environment via link 118. In certain embodiments, server 102 receives metrics 140 from a plurality of distributed nodes 130, as illustrated in FIG. 2B, via network 108 for storage in memory 120. Network 108 facilitates wireless or wireline communication between computer server 102 and any other computer. Network 108 may communicate, for example, Internet Protocol (IP) packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations. Generally, interface 112 comprises logic encoded in software and/or hardware in a suitable combination and operable to communicate with network 108. More specifically, interface 112 may comprise software supporting one or more communications protocols associated with communications network 108 or hardware operable to communicate physical signals.

Client 104 comprises any computer and may include input devices, output devices, mass storage media, processors, memory, interfaces, communication ports, or other appropriate components for communicating formatted metrics 140 to the user of client 104. It will be understood that there may be any number of clients 104 coupled to server 102 or client 104 may comprise a management component of server 102. As used in this document, client 104 is intended to encompass a personal computer, workstation, network computer, kiosk, wireless data port, personal data assistant (PDA), one or more processors within these or other devices, or any other suitable processing or display device. Moreover, "client 104" and "user of client 104" may be used interchangeably without departing from the scope of this disclosure. For example, client 104 may comprise a computer that includes an input device, such as a keypad, touch screen, mouse, or other device that can accept information, and an output device that conveys information associated with the operation of server 102 or clients 104, including digital data, visual information, or metrics 140. Both the input device and output device may include fixed or removable storage media such as a magnetic computer disk, CD-ROM, or other suitable media to both receive input from and provide output to users of clients 104 through a portion of the web product interface, namely graphical user interface (GUI) 116.

GUI 116 comprises a graphical user interface operable to allow the user of client 104 to interface with system 100 and view the output of a plurality of software products. Generally, GUI 116 provides the user of client 104 with an efficient and user-friendly presentation of data provided by system 100, such as a display or report of one or more database tables storing metrics 140. GUI 116 may comprise a plurality of displays having interactive fields, pull-down lists, and buttons operated by the user. In one example, GUI 116 presents the formatted output and receives commands from client 104. It should be understood that the term graphical user interface may be used in the singular or in the plural to describe one or more graphical user interfaces and each of the displays of a particular graphical user interface. Further, GUI 116 contemplates any graphical user interface, such as a generic web browser, that processes information in system 100 and efficiently presents the information to the user. Server 102 can accept data from client 104 via the web browser (e.g., Microsoft Internet Explorer or Netscape Navigator) and return the appropriate HTML or eXtensible Markup Language (XML) responses. For example, GUI 116 may comprise a front-end of management engine 115. Accordingly, for ease of understanding, the term GUI 116 and management engine 115 may be used interchangeably; although, it will be understood that management engine 115 will often include more functionality than a graphical user interface.

In one aspect of operation, management engine 115 interfaces metrics 140 into database 124 based on mappings defined in one or more mapping tables 170. Generally, management engine 115 maps individual classes to database tables and properties within those classes to columns within the respective database tables. According to certain embodiments, the mapping of metrics 140 to database-compliant structures depends on whether metrics are .NET specific or correlated. More specifically, if metrics 140 are correlated, then management engine 115 at least partially maps based on an instance of each particular class and one of the mapping tables 170. Whereas if metrics 140 are related to or otherwise associated with the .NET framework, then management engine 115 may locate one or more tags and sub-tags in the appropriate mapping table 170 for data mapping between the classes and properties to tables and columns. Once management engine 115 determines the type of metrics 140 and identifies the appropriate data map, then engine 115 generates one or more SQL statements 160 based on the identified data map. Accordingly, class-based metrics 140 are then in table-based form and are easily readable and manipulated by the user or another process.

Figure 2A:
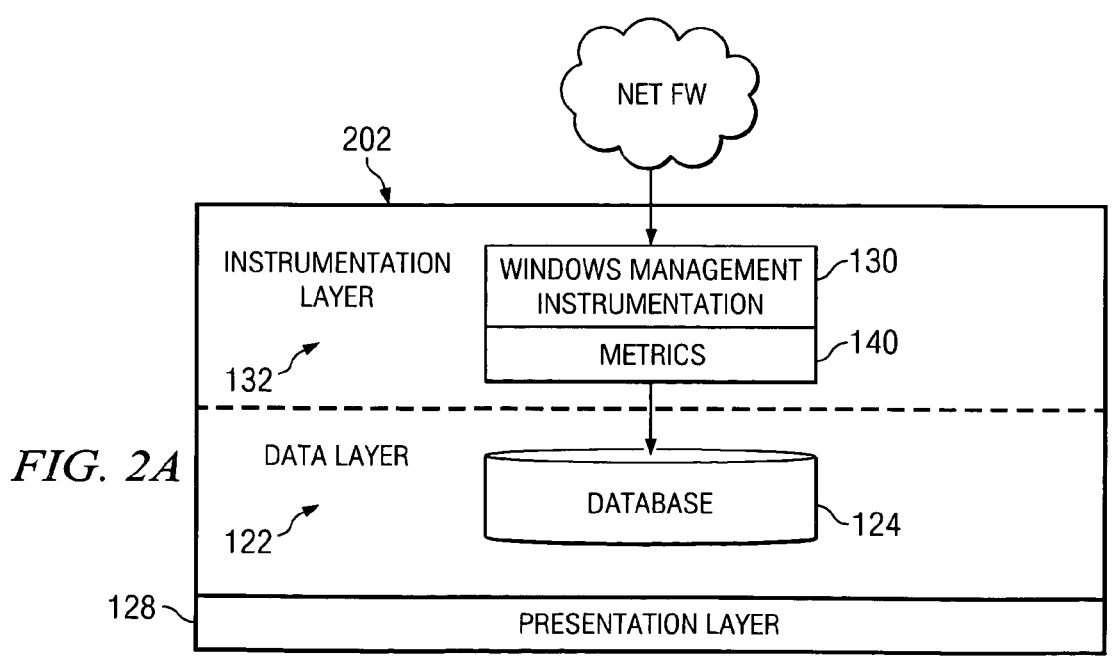
FIGS. 2A-B illustrate alternative configurations of the scaleable system in FIG. 1.
Figure 2B:
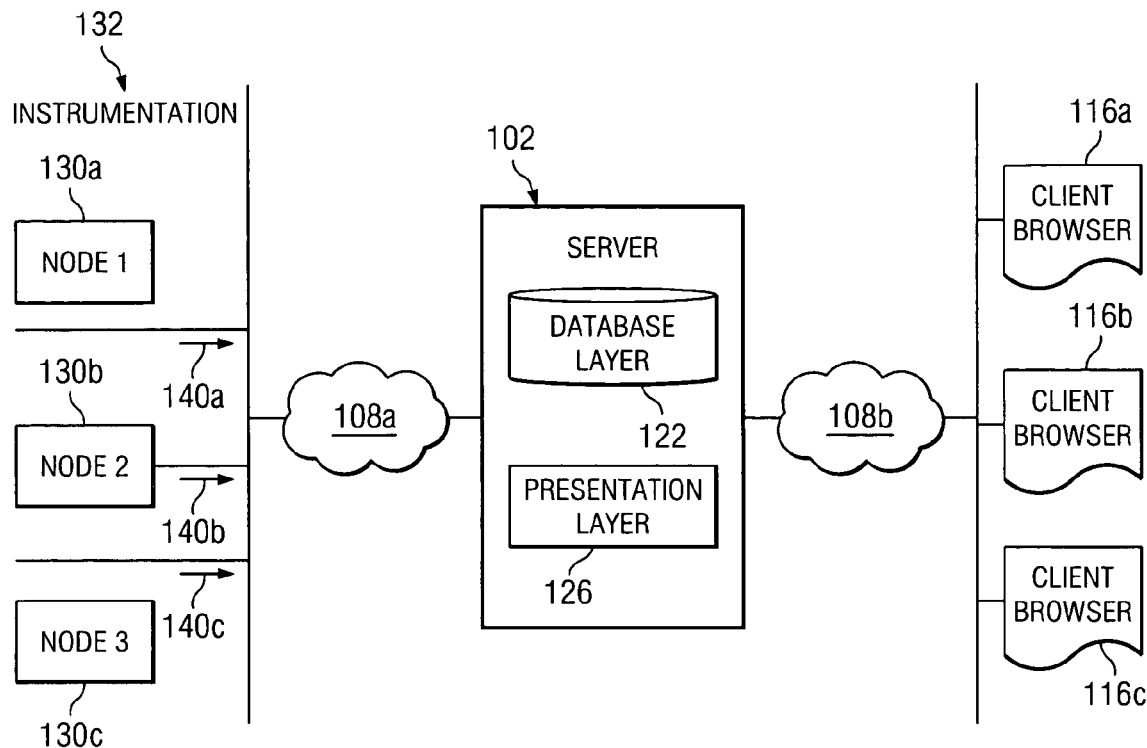

FIGS. 2A-B illustrate alternative configurations of scaleable system 100. At a high level, FIG. 2A illustrates a local configuration of computer 202 operable to store metrics 140 in a database 124 or present metrics 140 to a user through GUI 116 in table format and FIG. 2B illustrates a distributed architecture such as, for example, a portion of an enterprise. In FIG. 2A, computer 202 includes three logical layers: instrumentation layer 132, data layer 122, and presentation layer 128. These three logical layers may be part of management engine 115 or may be communicably coupled with management engine 115 without departing from the scope of this disclosure. Instrumentation layer 132 communicates with the .NET framework through example Windows Management Instrumentation 130, which generates, populates, or formats standard metrics 140. Management engine 115 transforms, maps, or converts metrics 140 into database-compliant data structures, such as SQL script 160, and communicates the data structure to database 124. Using any suitable technique, these data structures are loaded or interfaced with database 124. The logical presentation layer is operable to present the information stored in example SQL script 160 to a user through GUI 116. For example, presentation layer 128 may present one or more HTML pages generated based on SQL script 160.

In FIG. 2B, system 100 distributes portions of processing among a plurality of instrumentation nodes 130, server 102, and one or more client browsers 116. In this embodiment, instrumentation layer 132 is remote from and communicably coupled with server 102 and then segmented among the plurality of nodes 130. For example, each node 130 may be an extensible instrumentation agent operable to monitor a unique portion of a data processing environment for extensible instrumentation layer 130. Each instrumentation node 130 collects metric information and communicates metrics 140 to server 102 for processing. Once server 102 receives metrics 140, management engine 115 generates SQL script 160 for storage in database 124. Further, server 102 may generate graphical displays based on metrics 140, SQL scripts 160, or database 124. These graphical displays may then be presented, using presentation layer 126, to one or more clients through any number of GUIs 116.

Figure 3:
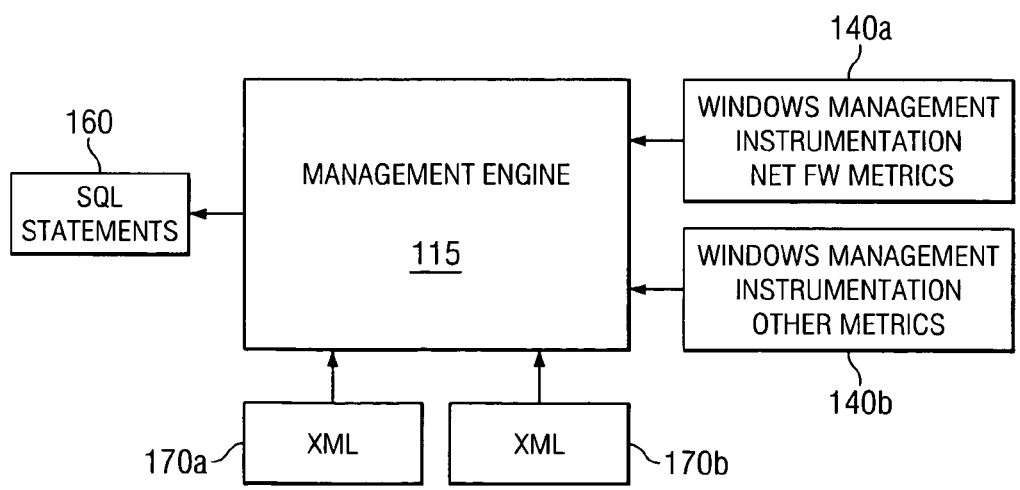
FIG. 3 is an example data flow diagram illustrating the mapping of metrics to database-compliant data structures.

FIG. 3 is an example data flow diagram illustrating the mapping of metrics 140 to a database. In the illustrated embodiment, metrics 140 are identified as one of two example categories, .NET framework metrics 140a and other/correlated metrics 140b. Management engine 115 retrieves, receives, selects, or otherwise identifies metrics 140a and/or 140b for storage in database 124 or presentation to a particular user, such as a system administrator. For example, extensible instrumentation layer 130 may automatically communicate metrics 140a to management engine 115. In another example, the particular user may manually instruct management engine 115 to retrieve metrics 140b from extensible instrumentation layer 130. Once management engine 115 identifies metrics 140a or 140b, engine 115 parses, maps, converts, or processes metrics 140a and/or metrics 140b based, at least in part, on first or second mapping tables 170a and 170b. In one embodiment, first mapping table 170a may be a document operable to map from .NET framework metrics 140a to one or more SQL statements 160 and second mapping table 170b may be a document operable to map from correlated metrics 140a to one or more SQL statements 160. As described above, mapping tables 170a and 170b may each represent a portion of one document, array, or object without departing from the scope of the disclosure. At any appropriate time, management engine 115 generates the one or more SQL scripts 160 or files based on the determined data mappings. Then, management engine 115 (or some other component such as a DBMS) may load into or otherwise interface SQL scripts 160 with database 124 for addition, modification, or deletion of table schemas or data within database 124.

Figure 4A:
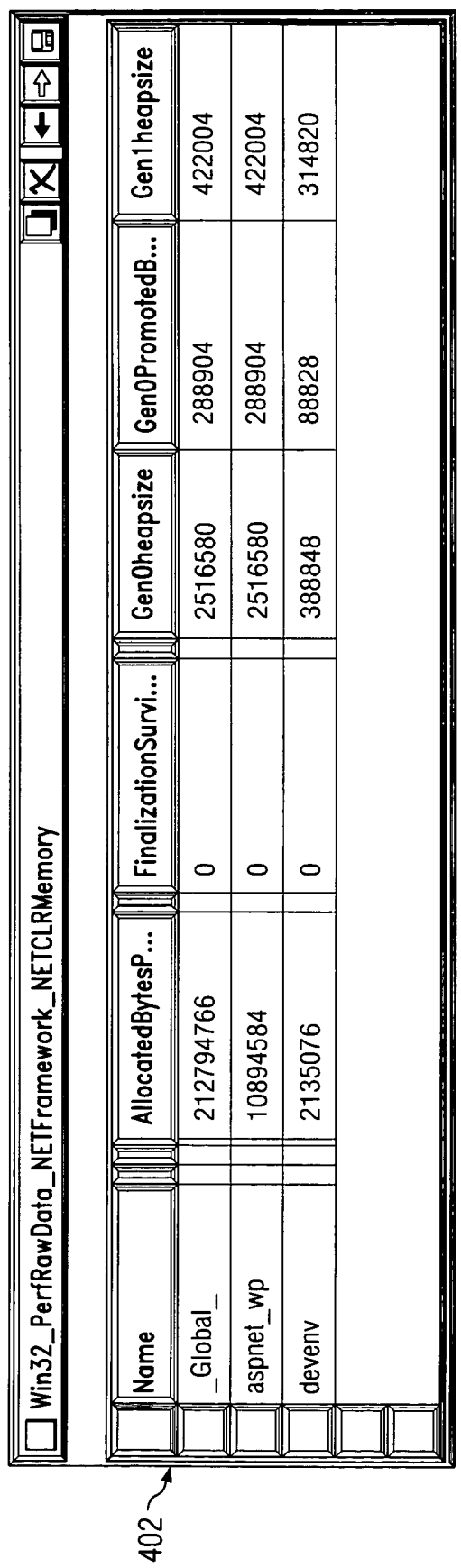
FIGS. 4A-B illustrate various displays of example database tables storing Windows metrics.
Figure 4B:
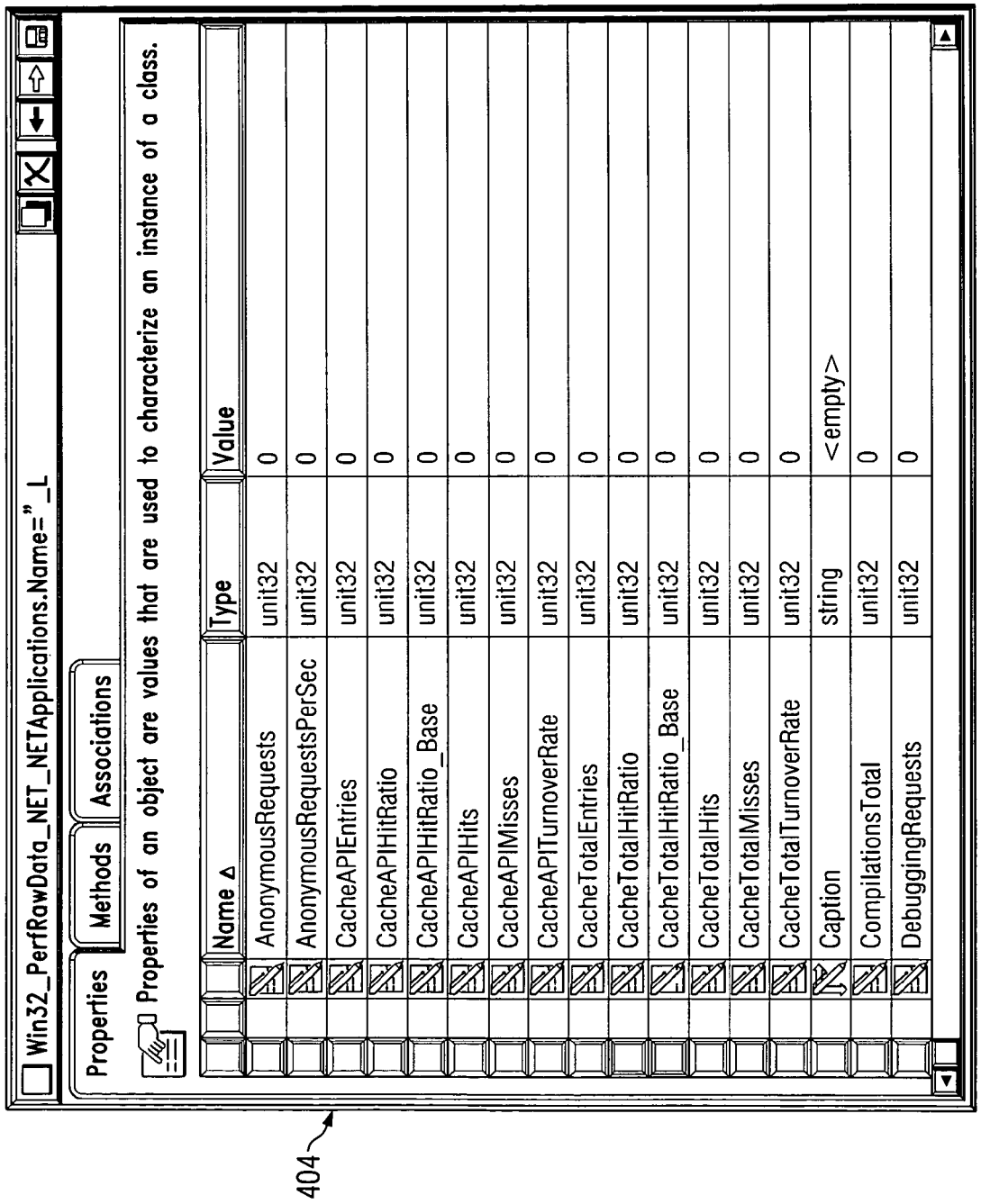

FIGS. 4A-B illustrate various example displays of database tables storing metrics 140. It will be understood that each view is for illustration purposes only and system 100 may utilize or present any graphical display in any format, with any suitable data, without departing from the scope of this disclosure. FIG. 4A illustrates one view 402 of a subset of metrics 140 received from extensible instrumentation layer 130. In this example display, GUI 116 presents metrics 140 associated with CLR memory WMI class. As illustrated, the WMI class is presented in table format based on conversion into a database-compliant structure. This table is generated based on the CLR memory WMI class and the various columns (AllocatedBytes, FinalizationSurvivor, Hen0heapsize, Gen0Promoted, and Gen1heapsize, for example) are generated based on the attributes defined within the WMI class. Each row may be generated or populated based portions of interfaced metrics 140. For example, management engine 115 may receive similar metrics 140 from two different environments, aspnet_wp and devenv for example, and generate two rows based on these two environments. FIG. 4B illustrates a second example view 404 of data utilized in system 100. In this example, view 404 presents various properties of a class from metrics 140 and descriptive information about each property such as, for example, name, type, and value. Management engine 115 uses this information or mapping table 170, which may include similar information, to map class and property information in metrics 140 to database-compliant data structures for use by database 124, as well as other components in system 100.

Figure 5A:
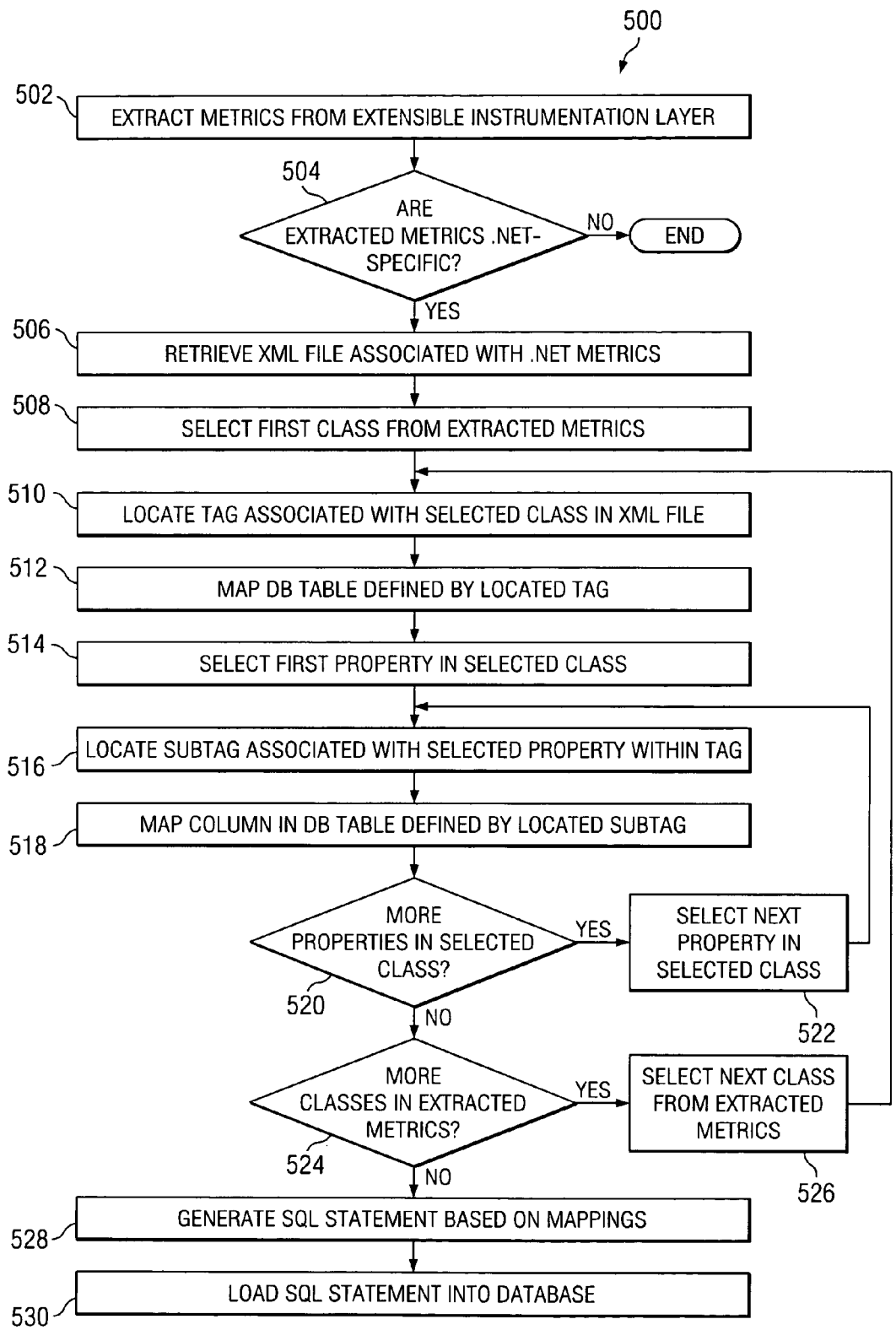
FIGS. 5A-B are flow diagrams illustrating example methods for storing Windows metrics in a database according to various embodiments of the disclosure.
Figure 5B:
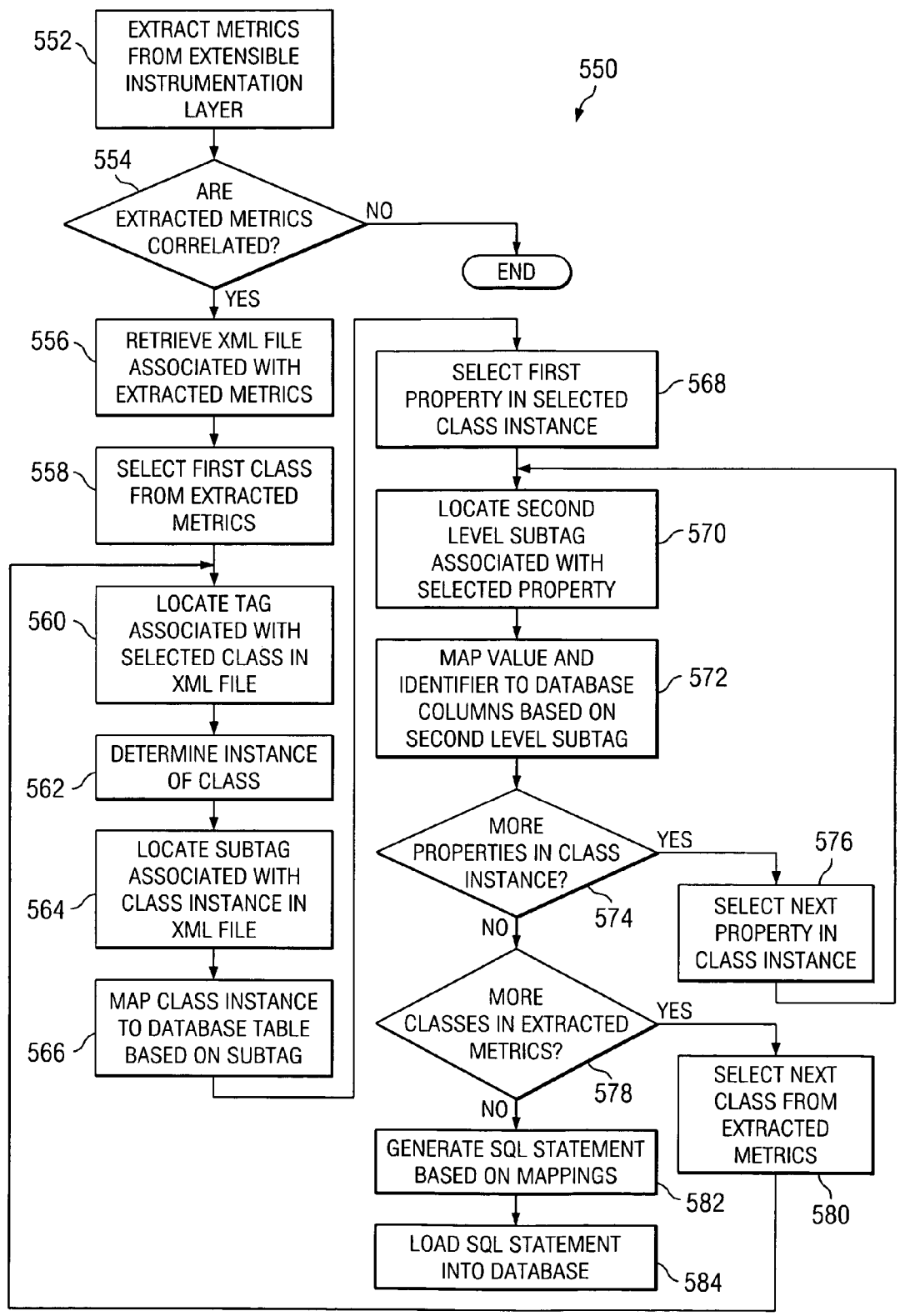

FIGS. 5A-B are flow diagrams illustrating example methods 500 and 550, respectively, for storing metrics 140 in database 124 according to various embodiments of the disclosure. Generally, FIG. 5A illustrates method 500, which converts .NET framework metrics 140, and FIG. 5B illustrates method 550, which converts correlated metrics 140. The following descriptions focus on the operation of management engine 115 in performing methods 500 and 550. But system 100 contemplates using any appropriate combination and arrangement of logical elements implementing some or all of the described functionality.

Method 500 begins when management engine 115 extracts, receives, or otherwise collects metrics 140 from extensible instrumentation layer 130 at step 502. In the illustrated embodiment, management engine 115 determines if extracted metrics 140 are .NET specific at decisional step 504. If metrics 140 are not .NET specific then method 500 ends and, perhaps, method 550 begins. Otherwise, management engine 115 retrieves a mapping table 170 associated with .NET metrics 140 at step 506. Once metrics 140 have been collected and the appropriate mapping table 170 has been located, processing proceeds to steps 508 through 526, where metrics 140 are mapped to one or more database-compliant data structures based on mapping table 170.

Management engine 115 begins mapping the extracted metrics 140 by selecting a first class from extracted metrics 140 at step 508. Next, management engine 115 locates a tag in mapping table 170 that is associated with the selected class at step 510. Once located, management engine 115 maps the selected class to a database table defined by the located tag. It will be understood that the database table in database 124 may be previously defined or undefined without departing from the scope of this disclosure. For example, the mapping of the selected class with the database table may comprise associating the class with a pre-defined database table. In another example, management engine 115 may create a database table using the name of the selected class, class level attributes, and other appropriate class characteristics. Next, at step 514, management engine 115 selects the first property in the selected class. Based on this selected property, management engine 115 locates a subtag within the current tag in mapping table 170 at step 516. At step 518, management engine 115 maps the selected property in the selected class to a column in the associated database table as defined by the subtag. As with step 512, this mapping may be to a previously defined or undefined column in the database table. For example, if the column was previously undefined, management engine may define the column attributes, such as data type and data length, based on the selected property and subtag. Next, at decisional step 520, management engine 115 determines if there are more properties in the selected class. If there are, then management engine 115 selects the next property in the selected class at step 522 and execution returns to step 516. Once there are no more properties in the selected class, processing proceeds to decisional step 524. At decisional step 524, management engine 115 determines if there are more classes in extracted metrics 140. If there are, management engine 115 selects the next class from extracted metrics 140 at step 526 and execution returns to step 510.

Once there are no more unmapped classes in extracted metrics 140 at decisional step 524, management engine 115 generates a SQL statement or script 160 at step 528 based on the mappings determined in steps 508 through 526. It will be understood that SQL statement 160 may be used to define a column or database table, upload data into database 124 based on metrics 140, update data already stored in database 124, or to perform any other appropriate database operation. Next, at step 530, management engine 115 may load or interface the generated SQL statement 160 into database 124.

Turning to FIG. 5B, method 550 begins at step 552 when management engine 115 extracts, receives, or otherwise collects or identifies metrics 140 from extensible instrumentation layer 130 at step 552. In the illustrated embodiment, management engine 115 determines if extracted metrics 140 are correlated at decisional step 554. If metrics 140 are not correlated then method 550 ends. Otherwise, management engine 115 retrieves, selects, or identifies a mapping table 170 associated with extracted correlated metrics 140 at step 556. Once metrics 140 have been collected and the appropriate mapping table 170 has been located, processing proceeds to step 558 through 580, where metrics 140 are mapped to database 124 based on retrieved mapping table 170.

Management engine 115 begins mapping the extracted metrics 140 by selecting a first class from extracted metrics 140 at step 558. Next, management engine 115 locates a tag in mapping table 170 that is associated with the selected class at step 560. Once located, at step 562 management engine 115 identifies an instance of the selected class. Based on this instance, management engine 115 locates a subtag within the located tag in mapping table 170 at step 564. Management engine 115 then maps the selected class instance to a database table defined by the located subtag at step 566. As described in FIG. 5A, it will be understood that the database table in database 124 may be previously defined or undefined without departing from the scope of this disclosure. Next, at step 568, management engine 115 selects the first property in the selected class instance. Based on this selected property, management engine 115 locates a second-tier (or child level) subtag within the current class instance subtag in mapping table 170 at step 570. At step 572, management engine 115 maps the property in the selected class instance to a column in the database table as defined by the second level subtag. As with step 564, this mapping may be to a previously defined or undefined column in the database table. For example, if the column was previously undefined, management engine may define the column attributes such as data type and data length based on the selected property. Next, at decisional step 574, management engine 115 determines if there are more properties in the selected class. If there are, then management engine 115 selects the next property in the selected class at step 576 and execution returns to step 570. Once there are no more properties in the selected class, processing proceeds to decisional step 578. At decisional step 578, management engine 115 determines if there are more classes in extracted metrics 140. If there are, management engine 115 selects the next class from extracted metrics 140 at step 580 and execution returns to step 560.

Once there are no more unmapped classes in extracted metrics 140 at decisional step 578, management engine 115 generates a SQL statement 160 at step 582 based on the mappings from step 558 through 580. It will be understood that SQL statement 160 may be used to define a column or database table, upload data into database 124 based on metrics 140, update data already stored in database 124 or any other appropriate database operation. Next, at step 584, management engine 115 may load or interface the generated SQL statement 160 into database 124.

The preceding flowcharts and accompanying description illustrate only exemplary methods 500 and 550. In short, system 100 contemplates using any suitable technique for performing these and other tasks. Accordingly, many of the steps in these flowcharts may take place simultaneously and/or in different orders than as shown. Moreover, system 100 may use methods with additional steps, fewer steps, and/or different steps, so long as the methods remain appropriate.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method for storing data associated with an extensible instrumentation layer, the method executed by one or more processing devices configured to perform a plurality of operations, the operations comprising:

receiving, at a server, one or more metrics from an extensible instrumentation layer that is remote from the server and segmented among a plurality of nodes, each node of the plurality of nodes is an agent of the extensible instrumentation layer and configured to collect metrics, each of the one or more metrics defined by an object-oriented class and one or more properties, each property associated with at least one class, and each of the one or more metrics related to one of the plurality of nodes;

determining, at the server, whether at least one metric of the one or more metrics is a correlated metric or a .NET framework metric;

converting, at the server, the at least one metric into at least one data-base compliant data structure using a first mapping file when a result of the determination is that the at least one metric is a correlated metric, the database-compliant data structure storing the properties of the at least one metric;

converting, at the server, the at least one metric into at least one database-compliant data structure using a second mapping file when the result of the determination is that the at least one metric is a .NET framework metric, the database-compliant data structure storing the properties of the at least one metric; and storing the at least one database-compliant data structure in a database.

2. The method of claim 1, the extensible instrumentation layer comprising Windows Management Instrumentation (WMI).

3. The method of claim 1, wherein converting the at least one metric into at least one database-compliant data structure comprises:
mapping a first class of the at least one metric to a first database table; and
mapping a first property of the at least one metric associated with the first class to a first column in the first database table mapped from the first class.

4. The method of claim 3, wherein one or more of the first or second mapping files comprise an extensible Markup Language (XML) file, the XML file comprising at least one tag and one or more sub-tags and each tag associated with at least one class level attribute of a metric from the at least one metric being converted.

5. The method of claim 4, each tag comprising a map between one class and one database table and each subtag comprising a map between one property and one column.

6. The method of claim 3, the operations further comprising generating a structured query language (SQL) statement based, at least in part, on the mappings.

7. The method of claim 3, wherein at least one of the metrics is defined by a plurality of classes and the operations further comprising mapping a relationship between two of the plurality of classes and a relationship between two database tables.

8. The method of claim 1, the first mapping file and the second mapping file comprising first and second portions of one document.

9. The method of claim 1, wherein each of the one or more metrics is selected from the group consisting of:
load time for one or more assemblies, modules, and classes;
load count of one or more assemblies, modules, and classes;
load failures for one or more classes;
jit compile time for one or more functions;
jit search time for one or more functions;
jit count for one or more functions;
jit compile failures for one or more functions;
function execution time for one or more functions;
function exceptions for one or more functions; or function interop boundary crossings for one or more functions.

10. The method of claim 1, wherein receiving the one or more metrics from the extensible instrumentation layer comprises polling the extensible instrumentation layer at a predetermined interval.

11. A tangible computer-readable medium storing computer-executable code that when executed by one or more processing devices enables storing of data associated with an extensible instrumentation layer, the computer-executable code configured to:
receive, at a server, one or more metrics from an extensible instrumentation layer that is remote from the server and segmented among a plurality of nodes, each node of the plurality of nodes being an agent of the extensible instrumentation layer and configured to collect metrics, each of the one or more metrics defined by an object-oriented class and one or more properties, each property associated with at least one class, and each of the one or more metrics relating to one of the plurality of nodes;
determine, at the server, whether at least one metric of the one or more metrics is a correlated metric or a .NET framework metric;
convert, at the server, the at least one metric into at least one data-base compliant data structure using a first mapping file when a result of the determination is that the at least one metric is a correlated metric, the database-compliant data structure storing the properties of the at least one metric;
convert, at the server, the at least one metric into at least one database-compliant data structure using a second mapping file when the result of the determination is that the at least one metric is a .NET framework metric, the database-compliant data structure storing the properties of the at least one metric; and
store the at least one database-compliant data structure in a database.

12. The computer-readable medium of claim 11, the extensible instrumentation layer comprising Windows Management Instrumentation (WMI).

13. The computer-readable medium of claim 11, wherein the computer-executable code configured to convert the at least one metric into at least one database-compliant data structure comprises computer-executable code to:
map one class of the at least one metric to a database table; and
map a first property of the at least one metric associated with the one class to a first column in the database table mapped from the associated class.

14. The computer-readable medium of claim 13, wherein one or more of the first or second mapping files comprise an extensible Markup Language (XML) file, the XML file comprising at least one tag and one or more sub-tags and each tag associated with at least one class level attribute of a metric from the at least one metric being converted.

15. The computer-readable medium of claim 14, each tag comprising a map between one class identified by the attribute and one database table and each subtag comprising a map between one property and one column.

16. The computer-readable medium of claim 13, further configured to generate a structured query language (SQL) statement based, at least in part, on the mappings.

17. The computer-readable medium of claim 13, wherein at least one of the one or more metrics is defined by a plurality of classes and wherein the computer-executable code is further configured to map a relationship between two of the plurality of classes and a relationship between two database tables.

18. The computer-readable medium of claim 11, the first mapping file and the second mapping file comprising first and second portions of one document.

19. The computer-readable medium of claim 11, wherein each of the one or more metrics is selected from the group consisting of:
load time for one or more assemblies, modules, and classes;
load count of one or more assemblies, modules, and classes;
load failures for one or more classes;
jit compile time for one or more functions;
jit search time for one or more functions;
jit count for one or more functions;
jit compile failures for one or more functions;
function execution time for one or more functions;
function exceptions for one or more functions; or function interop boundary crossings for one or more functions.

20. The computer-readable medium of claim 11, wherein the computer-executable code configured to receive one or more metrics from the extensible instrumentation layer comprises computer-executable code configured to poll the extensible instrumentation layer at a predetermined interval.

21. A system for storing data associated with an extensible instrumentation layer comprising:

memory configured to store one or more mapping files and a database or a portion of a database;
one or more processors configured to:
receive one or more metrics from an extensible instrumentation layer that is remote from the server and segmented among a plurality of nodes, each node of the plurality of nodes is an agent of the extensible instrumentation layer and configured to collect metrics, each of the one or more metrics defined by an object-oriented class and one or more properties, each property associated with at least one class, and each of the one or more metrics relating to one of the plurality of nodes;
determine whether at least one metric of the one or more metrics is a correlated metric or a .NET framework metric;
convert the at least one metric into at least one data-base compliant data structure using a first mapping file when a result of the determination is that the at least one metric is a correlated metric, the database-compliant data structure storing the properties of the at least one metric;
convert the at least one metric into at least one database-compliant data structure using a second mapping file when the result of the determination is that the at least one metric is a .NET framework metric, the database-compliant data structure storing the properties of the at least one metric; and
store the at least one data structure in the database.

22. The system of claim 21, the extensible instrumentation layer comprising Windows Management Instrumentation (WMI).

23. The system of claim 21, wherein the one or more processors configured to convert the at least one metric into at least one database-compliant structure are further configured to:
map one class of the at least one metric to a database table based on the mapping file; and
map a first property of the at least one metric associated with the one class to a first column in the database table mapped from the associated class based on the mapping file.

24. The system of claim 21, wherein one or more of the first or second mapping files comprise an extensible Markup Language (XML), the XML file comprising at least one tag and a plurality of sub-tags, each tag associated with at least one class level attribute of one of the at least one metric being converted.

25. The system of claim 24, each tag comprising a map between one class identified by the attribute and one database table and each subtag comprising a map between one property and one column.

26. The system of claim 23, the one or more processors further configured to generate a structured query language (SQL) statement based, at least in part, on the mappings.

27. The system of claim 23, wherein at least one of the one or more metrics is defined by a plurality of classes and the one or more processors further configured to map a relationship between two of the plurality of classes and a relationship between two database tables.

28. The system of claim 21, the first mapping file and the second mapping file comprising a first and second section of one document.

29. The system of claim 21, wherein each of the one or more metrics is selected from the group consisting of:
load time for one or more assemblies, modules, and classes;
load count of one or more assemblies, modules, and classes;
load failures for one or more classes;
jit compile time for one or more functions;
jit search time for one or more functions;
jit count for one or more functions;
jit compile failures for one or more functions;
function execution time for one or more functions;
function exceptions for one or more functions; or function interop boundary crossings for one or more functions.

30. The system of claim 21, wherein the one or more processors are configured to receive the one or more metrics from the extensible instrumentation layer comprises one or more processors configured to poll the extensible instrumentation layer at a predetermined interval.

* * * * *